(12) United States Patent
Führer

(10) Patent No.: US 9,242,301 B2
(45) Date of Patent: Jan. 26, 2016

(54) TOOL FOR PROCESSING WORK PIECES

(75) Inventor: Matthias Führer, Döbeln (DE)

(73) Assignee: MAPAL FABRIK FUR PRAZISIONSWERKZEUGE DR. KRESS KG, Aalen (DE)

( * ) Notice: Subject to any disclaimer, the term of this patent is extended or adjusted under 35 U.S.C. 154(b) by 137 days.

(21) Appl. No.: 14/238,306

(22) PCT Filed: Aug. 22, 2012

(86) PCT No.: PCT/EP2012/003553
§ 371 (c)(1),
(2), (4) Date: Feb. 11, 2014

(87) PCT Pub. No.: WO2013/026569
PCT Pub. Date: Feb. 28, 2013

(65) Prior Publication Data
US 2014/0193218 A1  Jul. 10, 2014

(30) Foreign Application Priority Data
Aug. 24, 2011 (DE) .................. 10 2011 111 549

(51) Int. Cl.
*B23Q 11/00*   (2006.01)
*B23B 29/034*  (2006.01)
*B23B 27/00*   (2006.01)

(52) U.S. Cl.
CPC ......... *B23B 29/03489* (2013.01); *B23B 27/002* (2013.01); *B23B 2250/04* (2013.01);
(Continued)

(58) Field of Classification Search
CPC ............ B23B 2251/70; B23B 2250/16; B23B 2250/04; B23B 2250/08; B23B 2250/00; B23B 29/022; B23B 27/002; B23Q 11/0035; B23Q 11/0032; B23Q 11/0039; B23C 5/003
USPC .......................................... 408/143; 409/141
IPC .............................. B23B 29/02, 29/03, 29/034
See application file for complete search history.

(56) References Cited

U.S. PATENT DOCUMENTS 4,040,315 A * 8/1977 Bellingham ...... B23B 29/03492
                                                     82/131
5,154,554 A * 10/1992 Ariyoshi ............ B23Q 11/0035
                                                      408/143
(Continued)

FOREIGN PATENT DOCUMENTS

DE    667511 C   * 11/1938  ........ B23B 29/03492
DE    4428049 A1   2/1996
(Continued)

OTHER PUBLICATIONS

International Search Report for PCT/EP2012/003553, ISA/EP, Rijswijk, NL, mailed Nov. 30, 2012 (4 pages).
(Continued)

*Primary Examiner* — Daniel Howell
(74) *Attorney, Agent, or Firm* — Harness, Dickey & Pierce, P.L.C.

(57) ABSTRACT

A tool for machining work pieces includes a base body and at least first and second operating slides, slidable with respect to the base body. The first operating slide carries a machining element. At least one balancing pendulum can be pivoted with respect to the base body. A first coupling device connects the first operating slide and the second operating slide and is pivotably hinged to the first operating slide and the second operating slide. A second coupling device connects the first coupling device and the balancing pendulum. The second coupling device is pivotably hinged to the first coupling device at a hinge point. The second coupling device is pivotably mounted around a rotation axis of the tool. Displacement of the first operating slide resultantly displaces the second operating slide in an opposite direction relative to the rotation axis of the tool.

15 Claims, 6 Drawing Sheets

(52) U.S. Cl.
CPC ......... *B23B2250/08* (2013.01); *B23G 2240/04* (2013.01); *B23Q 11/0035* (2013.01); *Y10T 408/85* (2015.01)

(56) References Cited

U.S. PATENT DOCUMENTS

| | | | |
|---|---|---|---|
| 5,174,697 A | * | 12/1992 | Ariyoshi ................ B23B 29/04 408/147 |
| 5,230,266 A | | 7/1993 | Glomb et al. |
| 5,611,651 A | * | 3/1997 | Wohlhaupter .... B23B 29/03403 408/143 |
| 7,241,086 B2 | | 7/2007 | Esser |
| 7,871,226 B2 | | 1/2011 | Fronius et al. |

FOREIGN PATENT DOCUMENTS

| | | | | |
|---|---|---|---|---|
| DE | 19531837 A1 | | 3/1997 | |
| DE | 102007042248 A1 | | 3/2009 | |
| EP | 0402506 A1 | | 12/1990 | |
| EP | 1559494 A2 | | 8/2005 | |
| EP | 1789222 A1 | | 5/2007 | |
| GB | 672469 A | * | 5/1952 | ........... B23Q 1/4804 |
| JP | 02198741 A | * | 8/1990 | |
| SU | 1006081 A1 | * | 3/1983 | |

OTHER PUBLICATIONS

International Preliminary Report on Patentability and Written Opinion regarding International Application No. PCT/EP2012/003553 dated Feb. 25, 2014.

* cited by examiner

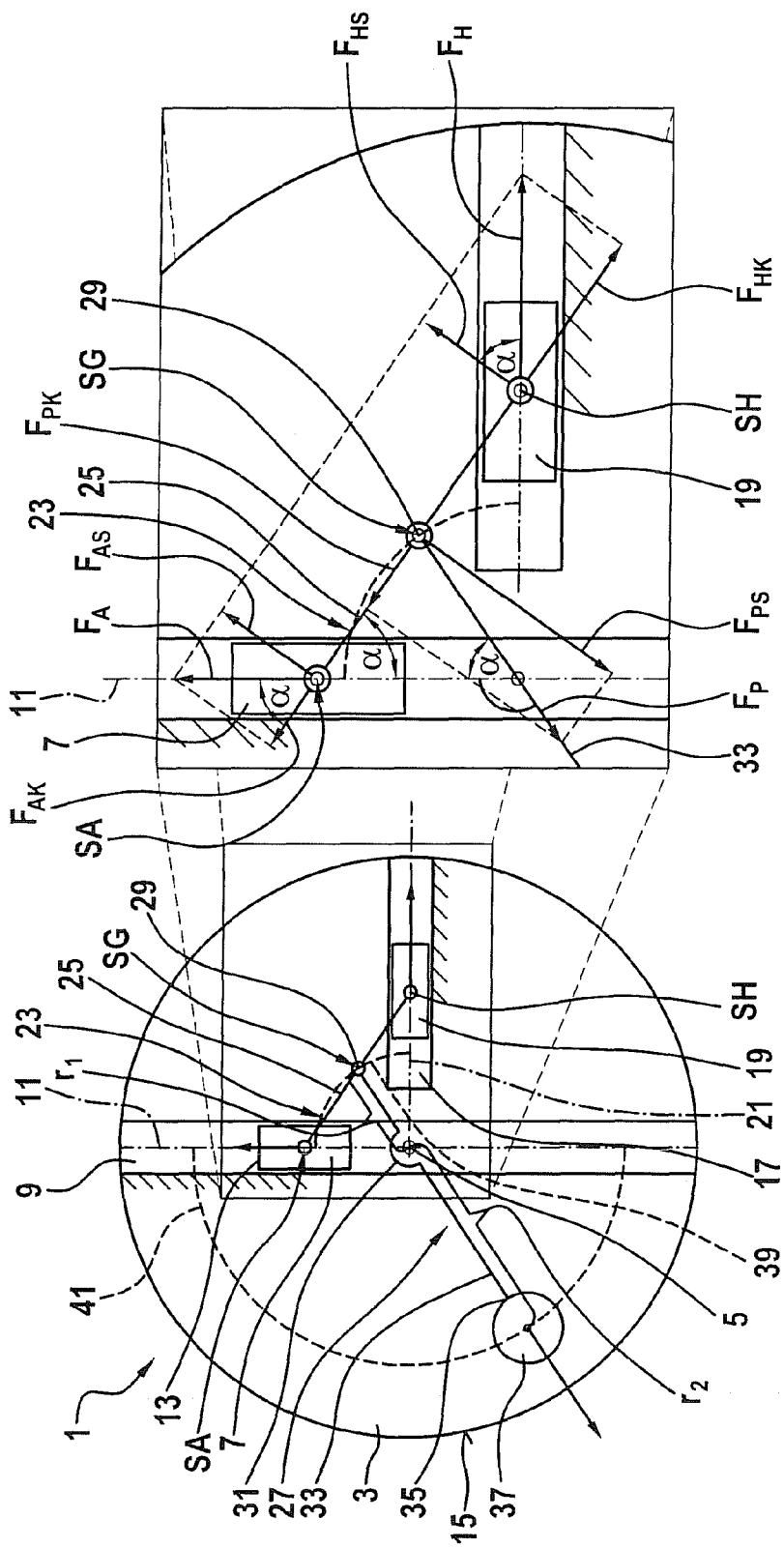

TOOL FOR PROCESSING WORK PIECES

CROSS-REFERENCE TO RELATED APPLICATIONS

This application is a 371 U.S. National Stage of International Application No. PCT/EP2012/003553, filed Aug. 22, 2012, which claims priority to German Patent Application No. DE 10 2011 111 549.1, filed Aug. 24, 2011. The disclosures of the above applications are entirely incorporated by reference herein.

The invention relates to a tool for processing work pieces according to the preamble of the claim 1.

Tools of the kind discussed here are in particular used for machining contours of workpieces, wherein chips are removed from the workpiece, for example by means of a machining element secured on an operating slide, in particular a cutting blade, wherein the tool rotates about a rotation axis with a preferably high speed. The operating slide carrying the machining element is displaced within the base body of the tool in the radial direction with respect to the rotation axis in order to implement a contour on the workpiece, but optionally also to compensate wear of the machining element. The sliding of the operating slide within the base body of the tool results in unbalance. This unbalance is compensated by another slide that is slidable relative to the base body of the tool, and by a balancing pendulum that is pivotable with respect to the base body of the tool. In order to effect this compensation, the operating slide and the other slide are connected to one another via a first coupling device which, in turn, is coupled to the balancing pendulum via a second coupling device. Tools of the kind discussed here are known (DE 10 2007 042 248 A1). They are characterized in that relatively many components are needed in order to implement in particular the coupling devices and to compensate the unbalance that occurs when displacing the operating slide.

It is therefore an object of the invention to provide a tool which avoids this disadvantage.

In order to achieve this object, a tool of the aforementioned kind is proposed which has the features of the claim 1. Such a tool is characterized in that the other slide is designed as an auxiliary slide, that the second coupling device, which is connected to the balancing pendulum, is pivotably hinged at a hinge point on the first coupling device, and that moreover, the second coupling device is mounted so as to be pivotable about the rotation axis of the tool. When the second coupling device rotates about the rotation axis of the tool, the first coupling device is displaced such that the operating slide and the auxiliary slide are displaced in opposite directions with regard to the rotation axis of the tool.

This configuration results in a simple construction of the tool, which not only avoids unbalance when displacing the operating slide, but also ensures compensation of the centrifugal force.

In a preferred exemplary embodiment, the first coupling device is implemented by a first coupling rod, which enables a particularly simple construction.

In another preferred exemplary embodiment, the construction is simplified in that the second coupling device too is likewise designed as a second coupling rod.

Moreover, particularly preferred is an exemplary embodiment in which the masses of the operating slide and the auxiliary slide are equal so that compensating the unbalance and the centrifugal force during a displacement of the operating slide is possible in a particularly simple manner. As already discussed above, the operating slide carries at least one machining element. The latter can be fitted directly on the operating slide. However, it is also possible, as explained in greater detail below, to fit a holding element onto the operating slide, on which holding element a machining element is then secured. If here and in the following, the mass of the operating slide is mentioned, this always refers to the total mass thereof, which is composed of the mass of the operating slide itself and the mass of the at least one machining element fitted thereon. Optionally, the mass of a holding element is to be added. In the exemplary embodiment discussed here, the mass of the operating slide including the mass of at least one machining element and, optionally, of a holding element therefore is equal to the mass of the auxiliary slide in order to implement a compensation of the unbalance and the centrifugal force during a displacement of the operating slide including the machining element and, optionally, the holding plate.

Moreover, particularly preferred is an exemplary embodiment in which the balancing pendulum can be arranged opposite to the operating slide and the auxiliary slide. This construction effects that that the centrifugal forces and unbalances can be compensated particularly well.

In another particularly preferred exemplary embodiment, the distance between the rotation axis of the tool and the hinge point of the second coupling device on the first coupling device is designated as $r_1$, and the distance between the rotation axis of the tool and the balancing pendulum is designated as $r_2$. It is provided here that the product of $r_1$ and total mass of the operating slide and the auxiliary slide equals to the product of $r_2$ and the mass of the balancing pendulum.

Further configurations arise from the remaining subclaims.

The invention is explained in greater detail below with reference to the drawings. In the figures:

FIG. 1 shows a schematic diagram of a tool in cross-section;

FIG. 2 shows an enlarged detail from FIG. 1;

Figure 3:
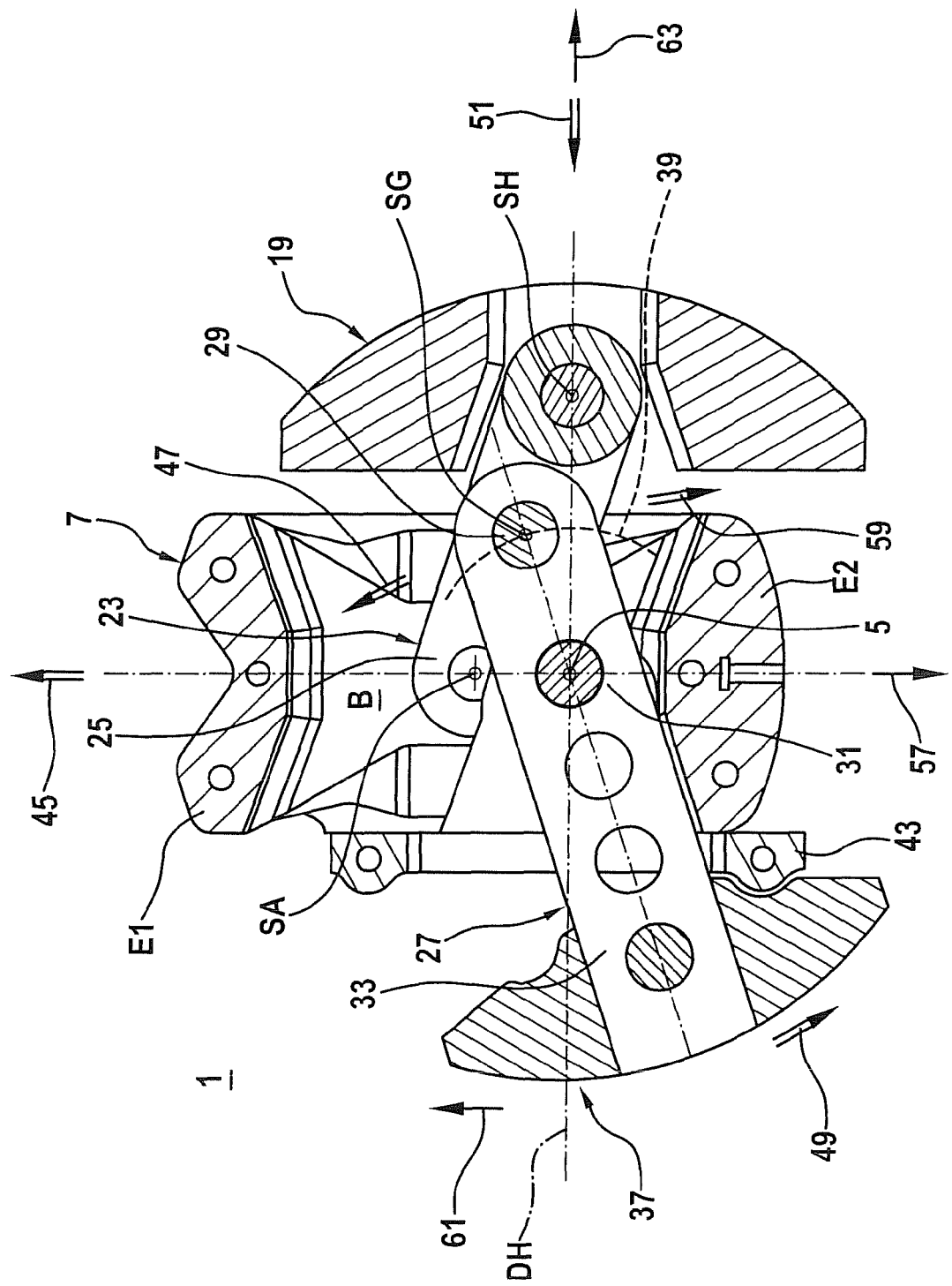
FIG. 3 shows the elements of a tool that are essential for compensating the centrifugal force an unbalance.

The schematic diagram according to FIG. 1 shows a tool 1 in cross-section, which has a base body 3 that rotates about a rotation axis 5 when machining a workpiece, which is not illustrated here.

The tool 1 has at least one operating slide 7 which can be moved along a guide provided in the base body 3, here preferably along a diameter line 11 that is indicated by a dotted line and runs perpendicular through the rotation axis 5. At least one machining element, for example a cutting blade, which is not illustrated here, is secured on the operating slide 7. Normally, the operating slide 7 carries a holding element, which is discussed in greater detail below. On this holding element, at least one machining element can be fitted so as to carry out the machining of the contour of a workpiece. Usually, the machining element protrudes beyond the front face of the tool 1 in order to machine the contour.

It is apparent from FIG. 1 that a guide 9 is provided along which the operating slide 7 is displaced. It is shown here that the guide 9 extends along an imaginary diameter line 11, which extends vertically here. Thus, the operating slide 7 can be displaced further up from the position illustrated in FIG. 1, but it can also be displaced in the opposite direction downwards across the region of the rotation axis 7. It is preferably provided that the operating slide 7 can be displaced over the entire diameter of the base body 3 of the tool 1. It is principally possible that a machining element is fitted on the operating slide in such a manner that it protrudes beyond the upper end 13 of said operating slide, and that when displacing the operating slide upwards, it also protrudes beyond the circumferential surface 15 of the base body 3.

The tool 1 has another slide, which is designed here as an auxiliary slide 19. Thus, the latter preferably is not provided with a machining element, for example a cutting blade, or the like.

The auxiliary slide 19 can be displaced along a guide 17 in the base body 3, preferably along an imaginary diameter line which is perpendicular to the diameter line 11.

The operating slide 7 and the auxiliary slide 19 are connected via a first coupling device 23 which is preferably designed as a coupling rod 25 and thus is implemented in a very simple manner. The coupling rod 25 engages in a pivotable manner on one side with the operating slide 7 and on the other side with the auxiliary slide 19. Preferably, the coupling rod engages at the center of gravity SA of the operating slide 7 and at the center of gravity SF of the auxiliary slide 19.

Preferably, the two slides 7 and 19 have the same mass so that the common center of gravity SG of the two slides 7 and 19 lies in the middle of the coupling rod 25.

The tool 1 has a second coupling device 27 that is pivotably hinged at a hinge point 29 on the first coupling device 23, thus, in the present case, on the coupling rod 25. Preferably, the hinge point 29 coincides with the common center of gravity SG of the operating slide 7 and the auxiliary slide 19.

Preferably, it is provided that the second coupling device 27 is mounted in a bearing in the region 31 to be pivotable about the rotation axis 5 in the base body 3. In order to implement a simple construction of the second coupling device 27, the latter is preferably also designed as a coupling rod 33. At the end 35 thereof opposite the hinge point 29, a balancing pendulum 37 is attached which is arranged opposite the operating slide 7 and the auxiliary slide 19, that is, the two slides 7 and 19 are arranged in an imaginary half of the base body 3 of the tool 1, and the balancing pendulum 37 is arranged in the opposing second half.

In order to enable a particularly compact construction of the tool 1, the coupling rods 25 and 33 are preferably plate-shaped.

The mass of the balancing pendulum 37 is selected such that the total center of gravity of the moving masses, thus of the slides and the balancing pendulum, lies on the rotation axis 5 of the tool 1. It is to be noted here again that in this connection, the mass of the operating slide is composed of the mass of the operating slide itself and the mass of a machining element and, optionally, the mass of a holding element fitted on the operating slide.

This construction ensures that the centrifugal forces occurring during the operation of the tool 1, which centrifugal forces are indicated by arrows engaging on the operating slide 7, the auxiliary slide 19 and the balancing pendulum 37, are balanced and are at equilibrium in the rotation axis 5 of the tool 1. In this manner it is ensured, even during a displacement of the operating slide 7 together with a machining element and, optionally, a holding plate, that the auxiliary slide 19 and the balancing pendulum 37 are displaced such that the total center of gravity of the moving masses lies on the rotation axis 5 of the tool 1 and that the centrifugal forces are balanced here. Thereby, unbalance is reliably avoided.

Due to the fact that the coupling device 27 is preferably designed as a coupling rod 33 that is pivotable in the region 31 about the rotation axis 5, the hinge point 29 on the first coupling rod 25 moves on a circular path 39, indicated by a dashed line, when the operating slide is displaced. In the course of this, the balancing pendulum 37 is likewise moved on a dashed circular path 41.

Even though the hinge point 29 of the first coupling rod 25 is guided on a circular path 39, the operating slide 7 and the auxiliary slide 19 move along the straight guide 9 and 17, respectively. The guides 9 and 17 preferably run at a right angle to each other. In terms of the basic principle of the coupling, it should be noted that in the case of an outward movement of the operating slide 7 towards the circumferential surface 15 of the tool 1, the auxiliary slide 19 performs a straight movement directed inwardly towards the rotation axis 5.

In a preferred exemplary embodiment of the tool 1, the centers of gravity of the operating slides 7 and the auxiliary slides 19 lie in a common imaginary plane to which the rotation axis 5 of the tool 1 is preferably perpendicular. Through this, not only a stationary but also a dynamic compensation of unbalance is achieved in a simple manner.

Particularly preferred, it is provided that the center of gravity of the balancing pendulum 37 is also arranged in the same plane as the slides 7 and 19.

In order to compensate the residual forces and the unbalance of the masses of the two slides 7 and 9, the mass of the balancing pendulum 37 and the distance thereof from the rotation axis 5 is matched to the mass of the operating slide 7 (including the mass of a machining element and, optionally, of a holding element) and the mass of the auxiliary slide 19, and also to the distance of the common center of gravity SG of the masses of the slides 7 and 19 from the rotation axis 5. Here, the distance of the common center of gravity SG from the rotation axis 5 is designated as $r_1$, and the distance of the center of gravity SP of the balancing pendulum 37 from the rotation axis 5 is designated as $r_2$. Thus, the following equation is obtained:

$$r_1 \cdot (m_A + M_H) = r_2 \cdot m_P$$

Here, the mass of the operating slide 7 including the mass of a machining element and, optionally, the mass of a holding element is designated as $m_A$, the mass of the auxiliary slide 19 as $m_H$, and the mass of the balancing pendulum 37 is designated as $m_P$.

The centrifugal forces, illustrated by arrows in FIG. 1, which are applied on the auxiliary slide 19 and on the balancing pendulum 37, are also apparent from the enlarged detail of FIG. 1 illustrated in FIG. 2.

At the center of gravity SA of the operating slide 7 (including the machining element and, optionally, the holding plate), the centrifugal force $F_A$ is applied, which, starting from the rotation axis 5, acts radially outward, thus along the imaginary diameter line 11. Said centrifugal force is composed of a force $F_{AK}$ acting in the direction of the coupling rod 25 of the first coupling device 27, and a force $F_{AS}$ that runs perpendicular to the coupling rod 25.

Accordingly, the centrifugal force $F_H$ applied at the center of gravity SH of the auxiliary slide 19 is composed of a partial force $F_{HK}$ that runs in the direction of the coupling rod 25, and a partial force $F_{HS}$ that runs perpendicular to the coupling rod 25.

The centrifugal force $F_P$ acting on the balancing pendulum 37 is transmitted via the coupling rod 33 to the common center of gravity SG of the two slides 7 and 19 or, respectively, to the hinge point 29 of the second coupling rod 33 at the first coupling rod 25. The centrifugal force $F_P$ acting on the balancing pendulum 37 is composed of a partial force $F_{PK}$ acting in the direction of the coupling rod 25 and a partial force $F_{PS}$ running perpendicular thereto.

FIG. 2 is intended to make clear that the centrifugal forces $F_A$, $F_H$ and $F_P$ acting on the slides 7 and 19 and also on the balancing pendulum 37 are compensated by the construction of the tool 1 illustrated here, thus, that an equilibrium of forces takes place, in particular if the equation specified above is met. As a result, the bearing provided in the region 31 for the second coupling element 33 is free of force.

FIG. 3 shows the elements of a tool 1 which are essential for centrifugal force and unbalance compensation, namely the operating slide 7, the auxiliary slide 19 and the balancing pendulum 37, which are illustrated in the FIGS. 1 and 2. Parts explained based on the FIGS. 1 and 2 are designated by identical reference numerals so that reference is made to the description of the preceding Figures.

The operating slide 7 and the auxiliary slide 19 are connected to each other via the first coupling device 23 which, as illustrated, is preferably designed here as a coupling rod 25—which is plate-shaped here. With one end, said coupling rod is pivotably connected to the first operating slide 7, preferably in the center of mass SA thereof. The other opposite end of the coupling rod 25 is pivotably hinged to the auxiliary slide 19, preferably in the center of mass SH thereof. The masses of the operating slide 7 and the auxiliary slide 19 are preferably equal so that the common center of mass SG lies in the middle of the coupling rod 25, where also the hinge point 29 of the second coupling device 27 is situated, which second coupling device is again designed as a coupling rod 33—which is plate-shaped here. In the region 31, the coupling rod 33 is mounted to be pivotable about the rotation axis 5 of the tool 1. A slightly thicker line is intended to indicate that for tolerance compensation, an oblong hole is provided in the coupling rod 33, through which oblong hole, a pivot pin passes that is fitted on a holder 43. Said holder 43 is fixed to the base body of the tool 1. Said holder 43 can also be part of the base body or part of a housing of the tool 1.

At that end of the coupling rod 33 that is opposite to the hinge point 29, the balancing pendulum 37 is attached.

In terms of the operating mode of the coupling of the slides 7 and 19 with the balancing pendulum 37, the following is to be noted:

If the operating slide 7, as indicated by a double arrow 45, would be displaced upwards—together with a non-illustrated machining element secured on the operating slide, and with an optionally provided holding plate —, the first coupling rod 25 would be carried along in such a manner that the hinge point 29 moves on the circular path 39 indicated in FIG. 1, namely upwards according to the double arrow 47. Accordingly, the balancing pendulum 37 would pivot downwardly about the rotation axis 35, as indicated by a double arrow 49.

As is apparent from FIG. 1, this would cause that the auxiliary slide 19 moves in the direction of the horizontal diameter line DH inwards towards the rotation axis 5 of the tool 1, as indicated by a double arrow 51.

Here in FIG. 3, the balancing pendulum 37 is in its lowest position so that a further pivoting movement is not possible. However—as mentioned—the double arrows 47 and 49 explain the basic principle of the coupling.

During an oppositely directed movement of the operating slide 7 upwards in the direction of the single arrow 57, the hinge point 29 on the first coupling rod 25 moves downwards according to the single arrow 59. This results in a pivoting movement of the balancing pendulum 37 in the upward direction, as indicated by a single arrow 61 in FIG. 3.

The downward movement of the operating slide 7 effects an outward movement of the auxiliary slide 19 in the direction of the horizontal diameter line DH, as indicated by a single arrow 63.

From all that it is apparent that the operating mode of the essential elements of the tool 1 as shown in the FIGS. 1 and 2 is provided in the configuration according to FIG. 3.

The operating slide 7 is substantially U-shaped. From a basis B, illustrated in FIG. 3 in a top view, elevations E1 and E2 extend at the upper and lower ends of the operating slide 7 from the basis B towards the viewer of FIG. 3, which elevations are illustrated by a dashed line because they are represented in a cross-sectional view. In these elevations E1 and E2, holes are provided which are indicated by black dots and in which screws can engage so as to fasten a holding element, which is not shown here and which is preferably formed as a holding plate (see FIGS. 4-8), to the operating slide 7 which can carry at least one machining element, for example a cutting blade or the like. It is also conceivable to fit at least one machining element directly onto the operating slide.

The auxiliary slide 19 is illustrated in cross-section. The coupling rod 25 engages inside the auxiliary slide 19 so that the two slides 7 and 19 can be arranged in a common imaginary plane to which the rotation axis 5 of the tool 1 is perpendicular. Preferably, the first coupling device 23 or the preferably plate-shaped coupling rod 25 thereof engages in an imaginary center plane of the operating slide 7 and accordingly in an imaginary center plane of the auxiliary slide 19.

Preferably, if possible, the balancing pendulum 37 is arranged in the common plane of the slides 7 and 19 so that the centers of gravity of the two slides 7 and 19 and of the balancing pendulum 37 lie in a common plane.

In the FIGS. 4 to 8 represented and discussed below, the essential elements of a tool illustrated in FIG. 3 are illustrated in different operating positions. Identical parts are indicated by identical reference numerals so that in this respect, reference is made to the preceding description. In the FIGS. 4 to 8, the partially sectioned elements of the tool 1 in FIG. 3 are illustrated in a top view. In addition, a holding plate 65 connected to the operating slide 7 is shown here.

Figure 4:
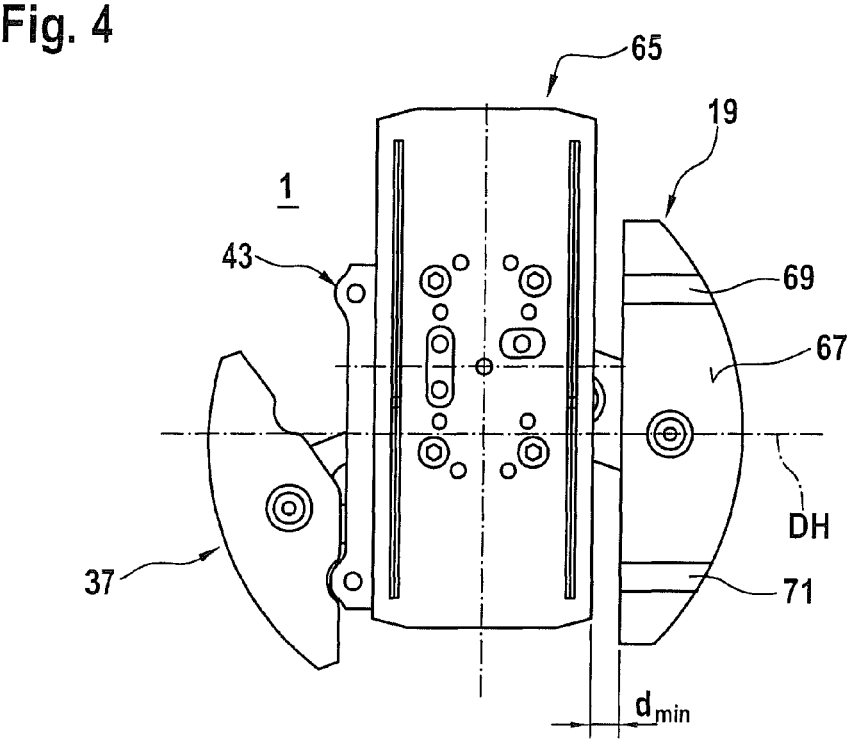
FIGS. 4 to 8 show different operating positions of the elements illustrated in FIG. 3.

FIG. 4 shows the elements illustrated in FIG. 3 in the position represented in FIG. 3. However, the operating slide 7 of the tool 1 is not visible because it is covered by a holding plate 65 which is fastened to the operating slide 7 by means of screws. Said holding plate has different holes at which machining elements, for example, cutting blades and/or holders thereof can be fastened.

In FIG. 4, the balancing spindle 37 is in its lowest position, which is also shown in FIG. 3. Accordingly, the operating slide 7, and thus also the holding plate 65 fastened thereon, has reached its uppermost position. The auxiliary slide 19 has reached its position maximally deflected to the left, as it is also illustrated in FIG. 3, namely at a minimum distance $d_{min}$ from the holding plate 65.

By means of FIG. 3 it was explained that the auxiliary slide 19 moves along or parallel to the horizontal diameter line DH. On the auxiliary slide's 19 upper side 67 facing towards the viewer, guiding devices are provided, namely here two guide grooves 69 and 71 which are parallel to each other and aligned with the horizontal diameter line DH, and in which fixed guide elements engage in order to ensure—according to the illustration in FIG. 4—the horizontal movement of the auxiliary slide 19.

FIG. 4 also shows the holder 43 which is mounted stationarily in the tool 1, for example, fastened to the base body 3 of the tool 1, or can be part of said tool or of a housing of the tool 1.

Figure 5:
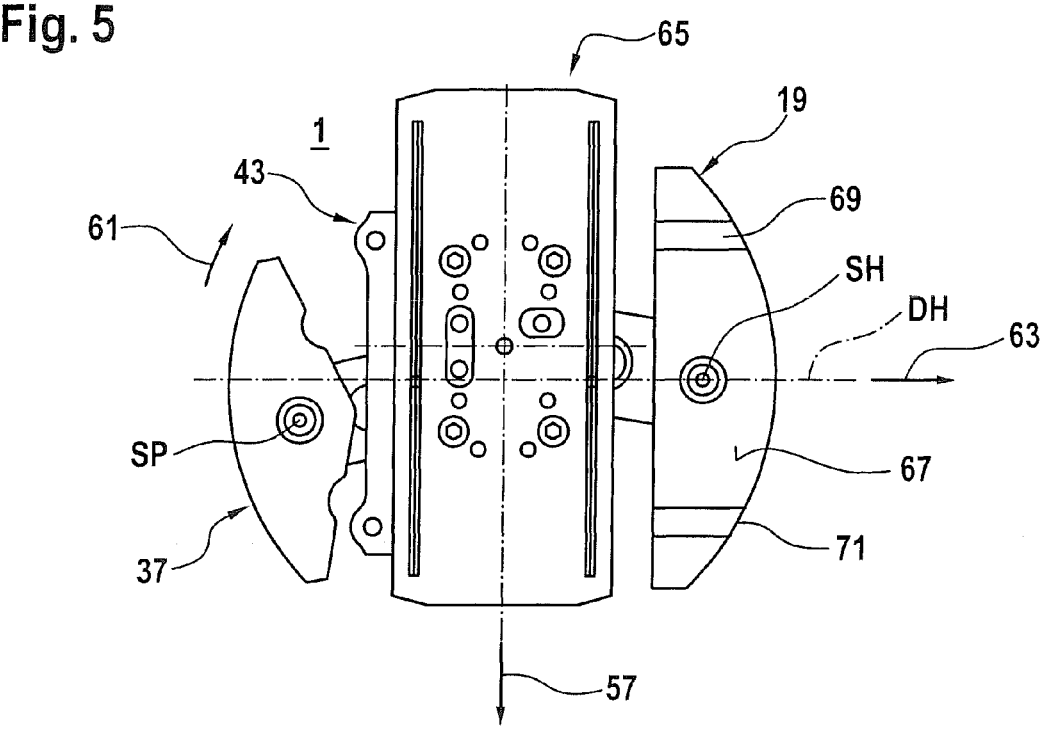

FIG. 5 shows the holding element designed as a holding plate 65 which, with respect to FIG. 4, is slightly moved downwards in the direction of the single arrow 57. As a result, the operating slide 7, which is covered here by the holding plate 65, is also displaced downwards. This results in that the balancing pendulum 37 pivots slightly upwards towards the single arrow 61, and that the auxiliary slide 19 is slightly displaced to the right along the horizontal diameter line DH.

Further displacement of the holding plate 65 and thus of the operating slide 7 downwards in the direction of the single arrow 57 results in that the balancing pendulum 37 pivots further up in the direction of the single arrow 61, and the auxiliary slide is displaced further to the right in the direction of the arrow 63. In the illustration according to FIG. 6, the centers of gravity SP of the balancing pendulum 37 and SH of the auxiliary slide 19 are situated on the horizontal diameter line DH. In this operating position of the elements illustrated here, the auxiliary slide 19 has the maximum distance $d_{max}$ from the operating slide 7 or the holding plate 65.

Figure 7:
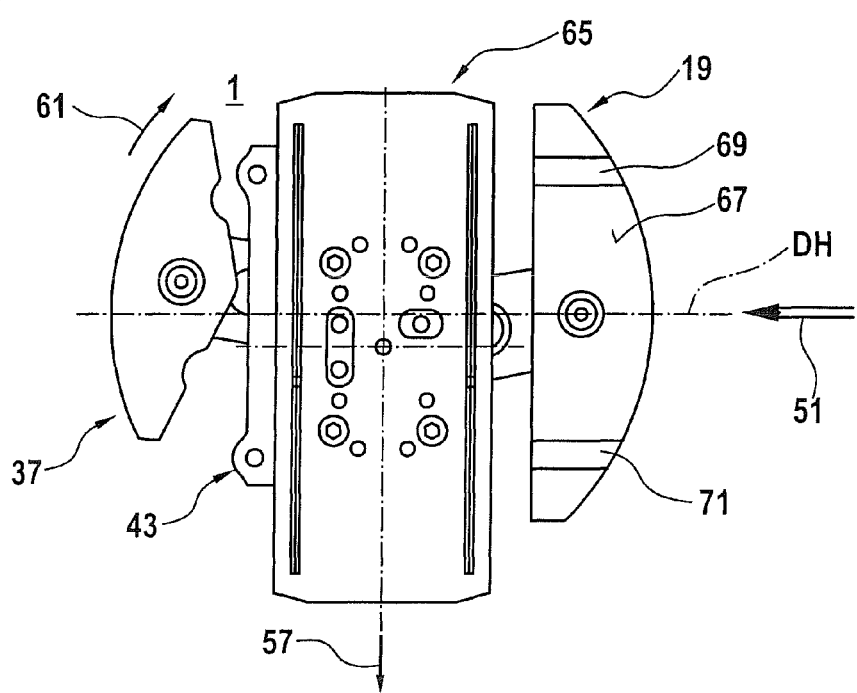

If, according to FIG. 7, the operating slide with the holding plate 65 is moved further down in the direction of the single arrow 57, the balancing pendulum 37 pivots over the horizontal diameter line DH upwards in the direction of the single arrow 61. During this movement, the auxiliary slide 19 approaches again the operating slide 7 or the holding plate 65 and moves in the direction of the double arrow 51 towards the rotation axis 5.

Figure 8:
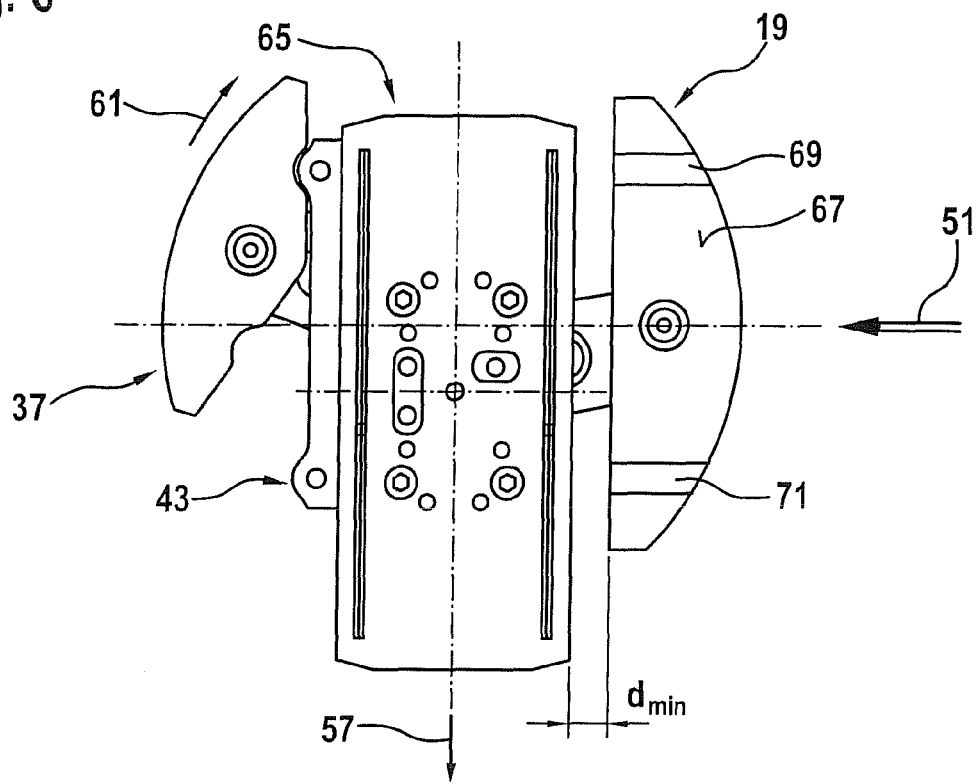

In FIG. 8, the operating slide with the holding plate 65 is maximally displaced downwards in the direction of the single arrow 57. As a result, the balancing pendulum 37 moves in the direction of the single arrow 61 into its maximum upper position. In the course of this, the auxiliary slide 19 maximally approaches the holding plate 65 and thus the operating slide 7 in the direction of the double arrow 51 so that the auxiliary slide is arranged at a minimum distance $d_{min}$ from the holding plate 65.

Figure 6:
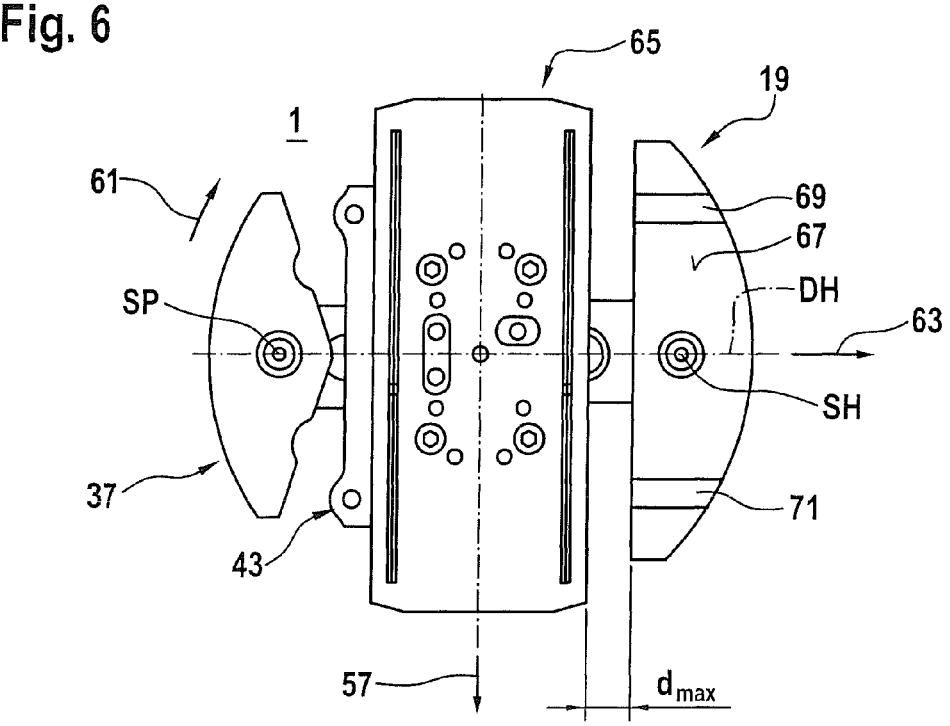
Figure 9:
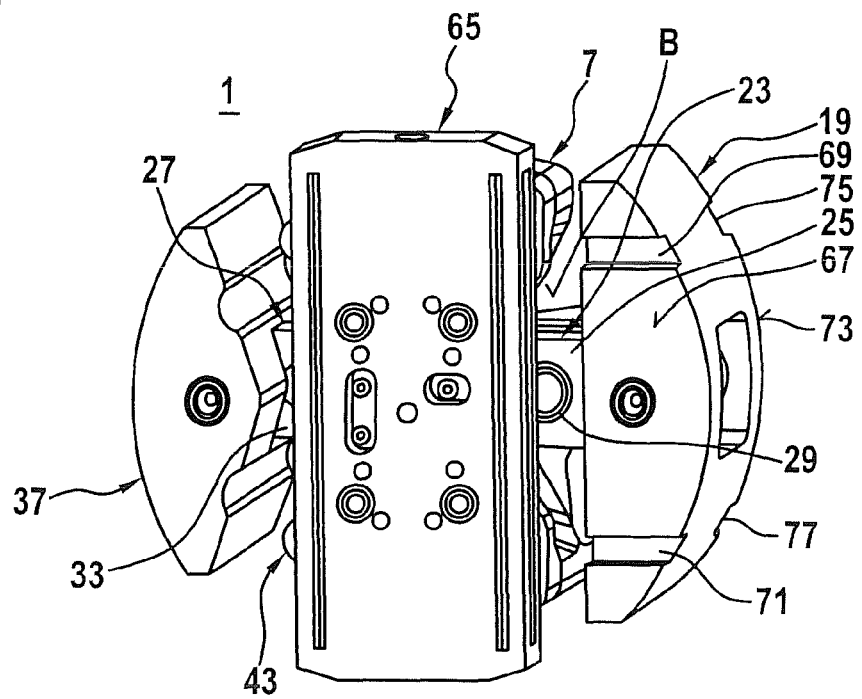
FIG. 9 shows a perspective view of the elements illustrated in the FIGS. 4 to 8.

FIG. 9 shows a perspective illustration of the essential elements of the tool 1 illustrated in the FIGS. 4 to 8, wherein said elements are in the position illustrated in FIG. 6. Identical parts are designated by identical reference numerals so that in this respect, reference is made to the preceding description.

FIG. 9 shows the holding element designed as a holding plate 65. The perspective view shows here the operating slide on which the holding plate 65 is fastened.

This illustration shows that the auxiliary slide 19 is not only provided with guide grooves 69 and 71 on its upper side 67 illustrated in FIG. 4. Rather, such guide grooves 75 and 77 are also provided on its lower side 73. However, it is also conceivable to provide such grooves, optionally only one groove, only on the lower side 73.

It is apparent from the illustration according to FIG. 9 that the first coupling device 23, here, the coupling rod 25 thereof, is hinged in the region of an imaginary center plane, thus, as it were, inside the auxiliary slide 19. Likewise, it can be seen here that the second coupling device 27 or the coupling rod 33 thereof engages in an imaginary center plane of the balancing pendulum 37.

Figure 10:
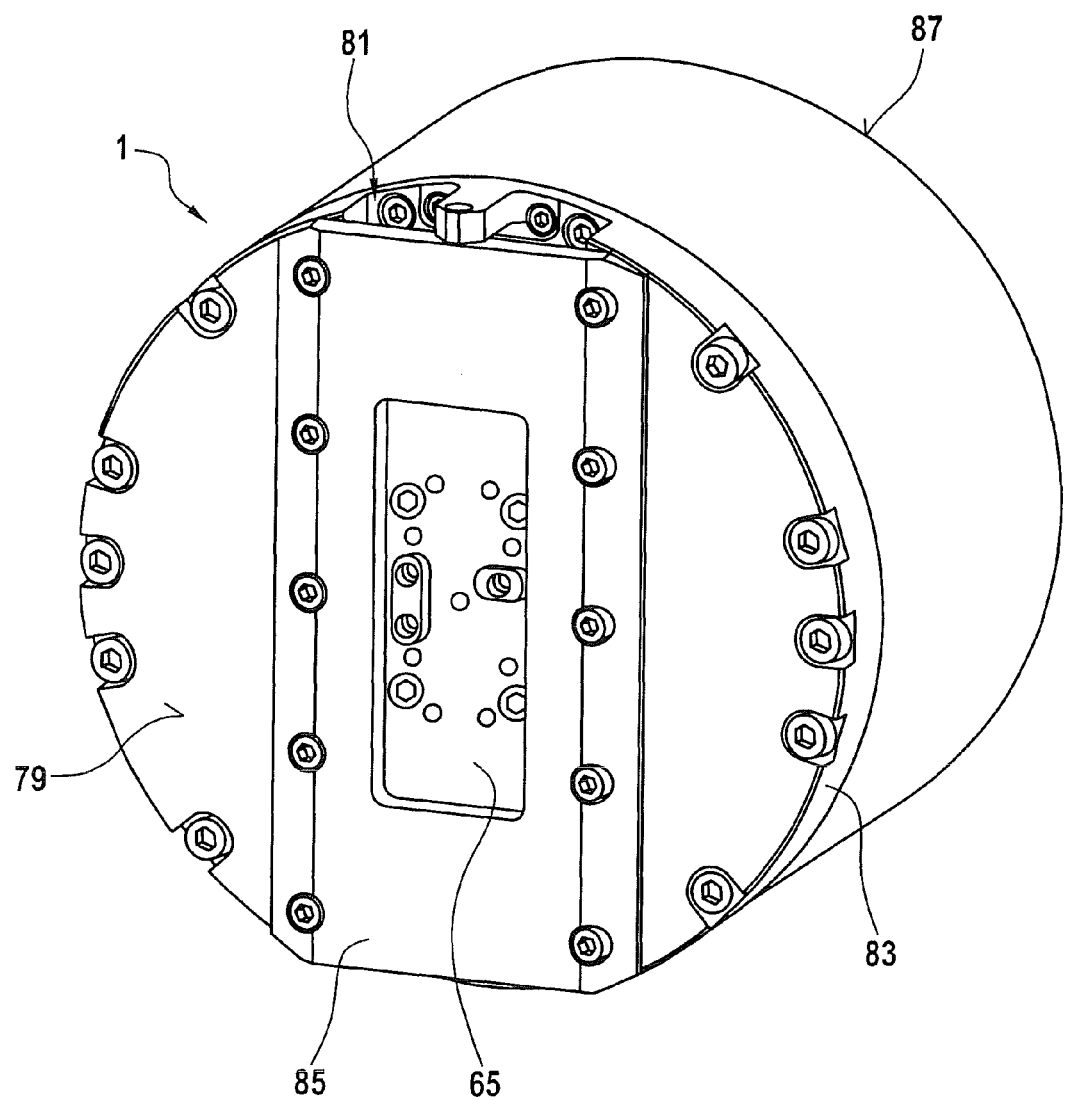
FIG. 10 shows a perspective front view of a tool.

Finally, FIG. 10 shows a tool 1 in a perspective view, wherein here the front 79 side thereof can be seen. In this front side, a recess 81 is implemented which is arranged here in a cover plate 83 that consists here of two parts. In this recess 81, the holding plate 65 is inserted which is held in the recess 81 by a cover plate 85 and is mounted in a slidable manner. In this manner it is possible, as illustrated in the FIGS. 4 to 8, that the holding plate 65 is slideably guided along an imaginary diameter line, here, in a vertical direction.

By displacing the holding plate 65, a machining element fastened thereon, thus any machining tool is displaced with respect to the front side 79 of the tool 1. In order to achieve centrifugal force and unbalance compensation, the auxiliary slide 19 and the balancing pendulum 37 are displaced during a sliding of the holding plate 65 and an associated sliding of the operating slide 7, as illustrated by means of the FIGS. 1 to 9.

At its rear end 87 opposite the front side 79, the tool 1 is connected in a suitable manner to a machine or to an extension piece, or to an adaptor or the like. Usually, a machine coupling engages at the rear end 87, which machine coupling sets the tool 1 in rotation and which provides for adjustment of the operating slide 7.

It is possible here that adjusting the operating slide 7 takes place by engaging with the same or with the auxiliary slide 19. Thus, the drive can effect a translational movement either of the operating slide 7 or the auxiliary slide 19. Also, conceivable is a simultaneous engagement on both slides 7 and 19. Preferably, adjusting a machining element takes place by adjusting the operating slide 7, which is effected by a drive that is not illustrated here.

However, it is also possible that a drive engages via the machine coupling with the balancing pendulum 37 and moves the same along the circular path 41 indicated in FIG. 1 so as to finally adjust the operating slide 7 and the holding plate 65 fastened thereto, and therefore also to adjust a machining element or tool fitted on the holding plate 65.

Overall, it becomes clear that the solution according to the invention provides a simply structured, compact construction for displacing an operating slide 7 within a rotating tool 1 and for implementing a very accurate centrifugal force and unbalance compensation at the same time. The construction illustrated and explained here is characterized by simple sliding and pivoting joints which are implemented in the connection region of the first coupling device 23 with the associated slides 7 and 9, but also in the connection region of the coupling devices 23 and 27.

Apart from that, it is apparent that during the displacement of the operating slide 7 or the holding plate 65, a stroke along an imaginary diameter line 11 (FIGS. 1 and 2), which stroke is long compared to the known solutions, thus a long adjusting travel of a machining element or machining tool which is coupled to the holding plate 65 can be implemented.

Regarding all these considerations of centrifugal force and unbalance compensation, it is to be taken into account, as noted above, that with the designation "mass of the operating slide 7", the total mass composed of the mass of the operating slide 7 itself, the mass of at least one actuating element, and the mass of a holding plate is considered, which is compensated by the mass of the auxiliary slide 19 and the balancing pendulum 37.

It becomes clear in particular from FIG. 1 that the center of gravity of the operating slide (with machining element and, optionally, holding plate) and the center of gravity of the auxiliary slide 19 lie on one side of an imaginary dividing line, and the center of gravity of the balancing pendulum 37 lies on the other side of this imaginary dividing line. This arrangement of the centers of gravity in two opposing regions of the base body 3 of the tool 1 makes it possible to compensate centrifugal force and unbalance without further additional masses. This enables the above-mentioned simple and compact construction of the tool 1.

Also, due to the fact that the coupling device 23 and the second coupling device 27 are directly coupled to each other at the hinge point 29, and due to the fact that the coupling devices are preferably designed as plate-shaped coupling rods which engage directly in the centers of gravity of the slides 7 and 19 or of the balancing pendulum 35, it is also ensured in a particularly simple manner that a compact construction of the tool is guaranteed.

The invention claimed is:

1. A tool for machining work pieces comprising
a base body;
at least a first operating slide and a second operating slide, the first operating slide carrying a machining element, the first and second operating slides slidable with respect to the base body;
at least one balancing pendulum pivotable with respect to the base body;
a first coupling device connecting the first slide and the second operating slide, the first coupling device pivotably hinged to the first operating slide and the second operating slide;
a second coupling device connecting the first coupling device and the balancing pendulum, the second coupling device pivotably hinged to the first coupling device at a hinge point and pivotably mounted for rotation about a rotation axis of the tool,
wherein displacement of the first operating slide resultantly displaces the second operating slide in a direction opposite the rotation axis.

2. The tool according to claim 1, wherein the first coupling device is hinged directly to the second coupling device.

3. The tool according to claim 1, wherein that the first coupling device is a plate-shaped first coupling rod.

4. The tool according to claim 1, wherein the second coupling device is a plate-shaped second coupling rod.

5. The tool according to claim 1, wherein the first and second slides are perpendicular to one another.

6. The tool according to claim 1, wherein a mass of the first operating slide is equal to a mass of the second operating slide, wherein a mass of the at least one machining element and optionally a mass of a holding device is to be added to the mass of the first operating slide.

7. The tool according to claim 1, wherein the first coupling device is hinged in centers of gravity of the first operating slide and the second operating slide.

8. The tool according to claim 3, wherein a common center of gravity of the first operating slide and the second operating slide lies in the first coupling rod.

9. The tool according to claim 8, wherein the common center of gravity moves on a circular path about the rotation axis of the tool.

10. The tool according to claim 1, wherein the at least one balancing pendulum is arranged opposite to the first operating slide and the second operating slide.

11. The tool according to claim 1, wherein a distance between the rotation axis of the tool and a hinge point of the second coupling device on the first coupling device is designated as r1, that a distance between the rotation axis of the tool and the balancing pendulum is designated as r2, and the following equation applies:

$r_1 \times$(total mass of the first operating slide including the mass of the at least one machining element and optionally of a holding element, and of the second operating slide)$=r_2 \times$mass of the balancing pendulum.

12. The tool according to claim 1, wherein the first coupling device is hinged in an imaginary center plane of the first operating slide and an imaginary center plane of the second operating slide.

13. The tool according to claim 1, wherein a center of gravity of the first operating slide and a center of gravity of the second operating slide lie in an imaginary plane to which a rotation axis of the tool is perpendicular.

14. The tool according to claim 13, wherein a center of gravity of the balancing pendulum is arranged in an imaginary plane in which lie centers of gravity of the first operating slide and the second operating slide.

15. The tool according to claim 1, further comprising a drive for actuating the first operating slide, the drive engaging one of the first operating slide, the second operating slide and the balancing pendulum.

* * * * *